United States Patent [19]
Ehrlich et al.

[11] 3,760,570
[45] Sept. 25, 1973

[54] CENTRIFUGALLY RESPONSIVE BRAKE FOR ROTARY TOOL

[75] Inventors: Stephen J. Ehrlich, Randallstown;
John R. Dwyer, Jr., Timonium;
Henry Klein, Baltimore, all of Md.

[73] Assignee: The Black and Decker Manufacturing Company, Towson, Md.

[22] Filed: Sept. 5, 1972

[21] Appl. No.: 286,589

[52] U.S. Cl. ..................... 56/10.8, 56/12.8, 188/185
[51] Int. Cl. ............................................. A01g 3/06
[58] Field of Search ..................... 56/10.8, 11.3, 255, 56/256, 12.8; 188/185, 186

[56] References Cited
UNITED STATES PATENTS
1,162,411  11/1915  Speer et al. ........................ 188/185
3,228,177  1/1966  Coates ........................... 56/10.8 X

*Primary Examiner*—Robert Peshock
*Assistant Examiner*—J. N. Eskovitz
*Attorney*—Leonard Bloom et al.

[57] ABSTRACT

An edger-trimmer including a housing supported for movement over the ground and having an upstanding handle. A motor within the housing drives a shaft having a cooling fan and a centrifugal brake means associated therewith, the brake including means normally biased into braking engagement with a stator about which the fan is circumposed, and releasable therefrom during operation of the edger-trimmer.

13 Claims, 6 Drawing Figures

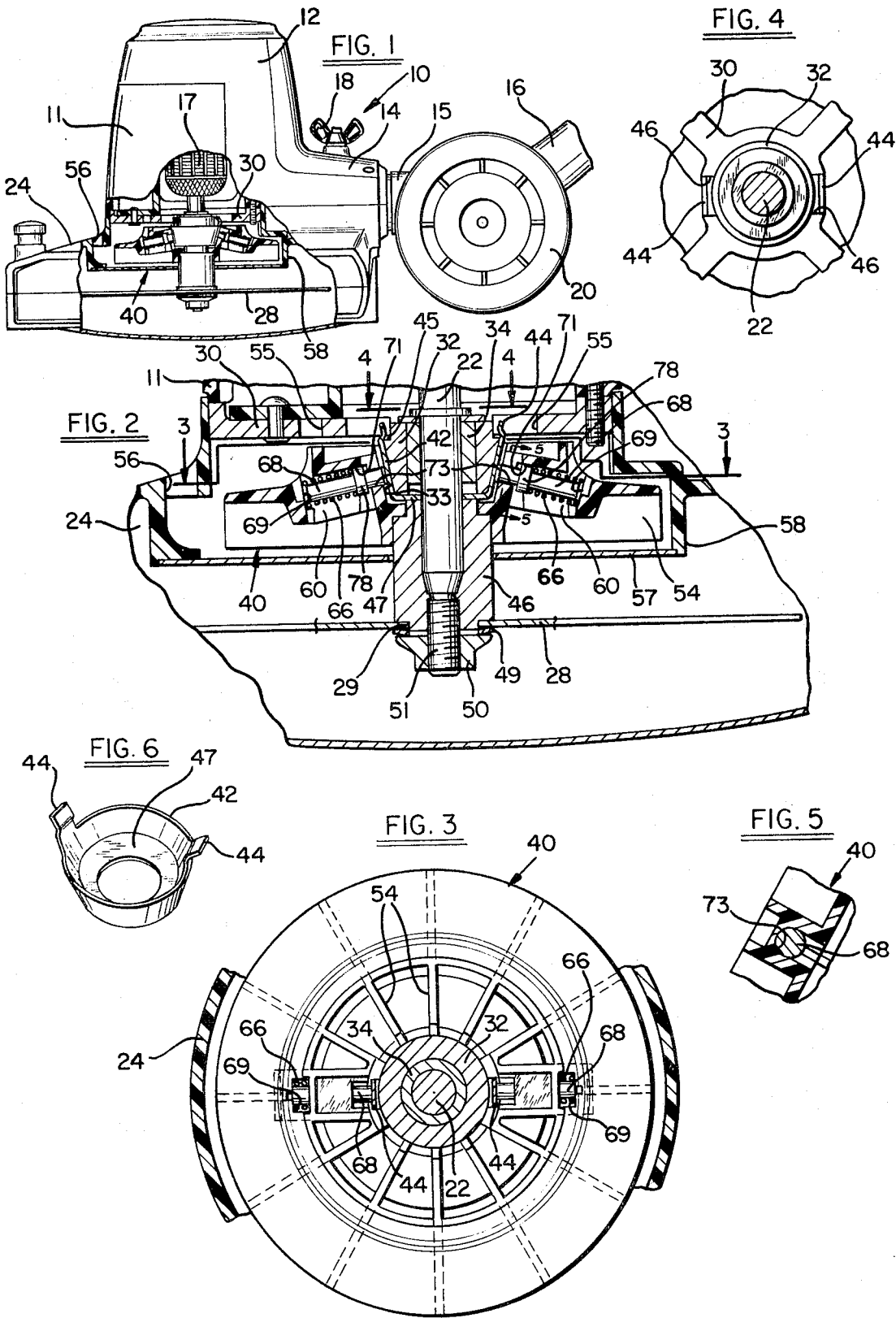

3,760,570

CENTRIFUGALLY RESPONSIVE BRAKE FOR ROTARY TOOL

SUMMARY OF THE INVENTION

An automatically operating, centrifugal-responsive brake assembly adapted for use in power tools and the like such as, for example, electric powered, rotary edger-trimmers. The assembly includes one or more braking members, carried by a rotating part of the tool, such as a motor cooling fan, and normally biased into frictional engagement with a wear resistant, stationary member or stator. When the tool is operating at or near normal speed, the brake members release under centrifugal force. However, when power to the tool is turned off, the rotating part slows and the braking members re-engage the stator bringing the tool to a rapid halt. The brake assembly of this invention embodies the utmost in simplicity and compactness, utilizing existing components in the tool and a minimum of additional parts, does not impede normal tool operation, and is fail-safe in operation rendering the tool safe in use.

BRIEF DESCRIPTION OF THE DRAWING

FIG. 1 is a side elevational view of an edger-trimmer embodying the invention, shown with a housing portion broken away and a portion of the handle removed;

FIG. 2 is an enlarged view of a portion of FIG. 1;

FIG. 3 is a sectional view taken along the line 3—3 of FIG. 2;

FIG. 4 is a sectional view taken along the line 4—4 of FIG. 2;

FIG. 5 is an enlarged sectional view taken along the line 5—5 of FIG. 2; and

FIG. 6 is a perspective view of the snap-fastened, removable brake shoe element.

DETAILED DESCRIPTION

Referring now specifically to the drawings, an edger-trimmer embodying the present invention is indicated generally at 10 and comprises a motor housing 11 having a handle housing 12 and a blade housing 24 suitably secured thereto. The handle housing 12 has a rearward extension 14 adapted to receive a terminal end of an upwardly extending handle 16, and is secured thereto by a releasable screw and wing nut assembly 18. A wheel housing includes a bracket 15 releasably secured to the handle 16 and carries a pair of wheels 20 (only one of which is shown) adapted to support the edger-trimmer 10 for movement along the ground.

An electric motor 17 is disposed within the motor housing 11 and has a rotatable output shaft 22 supported adjacent its lower end by a bearing 34 pressed in a hub 32 formed as an integral part of a motor mounting plate 30. A motor cooling fan assembly including a fan 40 and a hub 46 is secured to the motor output shaft 22. The fan 40 and hub 46 may be formed of one-piece material such as an aluminum casting, or they may be separate pieces, such as a plastic fan 40 secured to a steel hub 46. In either case, fan 40 includes blades 54 which serve to draw cooling air axially through the motor 17, through openings 55 in the plate 30, and discharges this air radially of the blades 54 and through openings 56 in the blade housing 24.

A cover plate 57 secured to a skirt 58 on the blade housing 24 seals the fan 40 from grass, dirt and other debris. An edger-trimmer blade 28 is mounted on a reduced diameter portion 29 of the fan hub 46 and is secured thereto by a bellville washer 48 and by a nut 50 threaded on a threaded end 51 of the shaft 22. Thus, when the edger-trimmer is turned on, which is achieved by connecting suitable line cord means (not shown) connected to a conventional power source, and by actuating a conventional switch (not shown) disposed at the top of handle 16, the motor 17 is energized and the blade 28 rotated.

The edger-trimmer 10 is, as its name indicates, constructed to be used as a trimmer, wherein the blade 28 is disposed for rotation through a generally horizontal plane, substantially as shown in FIG. 1, and as an edger, wherein the blade 28 rotates substantially through a vertical plane. In the latter use, the motor housing 11, handle housing 12, and blade housing 24 are disposed in a position rotated substantially 90° about the axis of the terminal end of handle 16 from that shown in FIG. 1. To this end, the screw assembly 18 is releasable from the handle 16 and the housing of the device 10 manually repositionable as desired.

It is desirable, for safety reasons, that rotation of the blade 28 cease within a relatively short time after the motor 17 has been re-energized. To this end, an improved, centrifugally responsive, brake assembly is incorporated in the edger-trimmer and functions to terminate rotation of the blade 28 within a matter of a few seconds following de-energization of the motor 17.

As shown in FIG. 2, the hub 32 defines a generally frustroconical surface 33 and has a complimentary shaped metal band 42 constructed of a suitable hard, wear resistant material fitted thereon. The band 42 is provided at its large end with spring tangs 44 adapted to snap-fit over a shoulder 45 and into recesses 46 on hub 32 to retain the band 42 on the hub 32 and to prevent it from turning relative thereto. In addition, a radial inturned flange 47 is formed at the other end of the band 42 to help position the band 42 on the hub 32 while also serving as a dust seal and grease retainer for bearing 34.

The fan 40 has a plurality of brake pins 68 carried in cavities 60 disposed normal to planes tangent to surface 33 of hub 32 and arranged symmetrically about the rotational axis of the fan. The pins 68 are normally biased into frictional rubbing engagement with the band (stator) 42 by coil compression springs 66 caged between a radial flange 78 on pins 68 and an abutment surface 69 in cavities 60. The pins 68 are slidably guided in cavities 60 by engagement with upper and lower surfaces 71, 73, respectively.

When the motor 17 is energized and the shaft 22 rotated, centrifugal force acting on the brake pins 68 causes them to move radially outwardly against the force of springs 67, and releases the inner ends of pins 68 from engagement with the stator or brake band 42. As long as the motor 17 remains energized and is operating at or near its normal speed, the brake pins 68 remain out of engagement with the brake band 42. When the motor 17 is de-energized, however, the rotational speed of the shaft 22, and correspondingly that of the fan 40, begins to drop, and, at some pre-determined reduced speed level, springs 67 move the pins 68 back into frictional rubbing engagement with the brake band 42. At this point, the rotational speed of the shaft 22 drops off abruptly and the springs 67 become even more effective in biasing the pins 68 into engagement with the brake band 42. The result is that rotation of the shaft 22, and that of the blade 28, comes to an abrupt halt upon de-energization of the motor 17.

The brake pins 68 and springs 66 are shown as substantially identical in construction and arrangement so that pins 68 will re-engage brake band 42 at substantially the same rotational speed of shaft 22. It will be appreciated, however, that it may be desirable to have some of pins 68 engage band 42 before the others such as, for example, to provide an "initial" and "final" braking action on shaft 22. In that case, the pins 68 and/or springs 66 would be constructed differently.

An additional feature of the invention, particularly useful in electric powered devices subject to severe loading during use, such as, for example, the electric powered edger-trimmer disclosed herein, is that the centrifugal brake device of the present invention delivers an audible warning when the speed of the motor 17 drops off to a level, for example, under load, which might cause motor damage. Thus, the user will be appraised of this potentially dangerous condition, and can immediately take the necessary remedial action.

It will be appreciated that by incorporating the brake assembly as an integral part of existing rotating and stationary parts, for example, the motor cooling fan 40 and the bearing supporting hub 32, the brake assembly itself contributes minimally to the axial dimension from the shaft supporting bearing 34 to the blade 28. This, of course, minimizes such problems as size and weight of the overall tool, shaft run-out, etc. Also, the conical construction of hub 32 and stator 42, and the angled disposition of brake pins 68, reduces the required radial dimension of the tool.

Furthermore, the brake assembly of this invention is purely mechanical in operation, as opposed to some prior brake assemblies requiring electrical actuation. In addition, the brake assembly of this invention is automatically actuated and deactuated when the motor is de-energized and energized, respectively, and requires no intentional act by the operator for its control. Finally, the brake assembly of the present invention embodies a minimum of separate parts and, correspondingly, the utmost in simplicity and minimum cost.

By the foregoing, there has disclosed an improved centrifugally operating brake assembly adapted for use with power operated devices and calculated to fulfill the inventive objects hereinabove set forth, and while a particular embodiment has been specifically illustrated and described herein, it will be appreciated that various additions, substitutions, modifications and omissions may be made thereto without departing from the spirit of the invention. Thus, the brake assembly of this invention can be utilized in tools or other powered devices embodying an output having other than pure rotary motion. For example, this invention can be incorporated in a device having an oscillating or reciprocating output driven through a power train having at least one rotating member.

We claim:

1. A power operated edger-trimmer comprising a housing supported for movement over the ground, a motor in said housing and driving a rotatable shaft, an upstanding handle fixed to said housing for control and manipulation of said edger-trimmer, switch control means on said handle for turning said edger-trimmer on and off, a blade operatively connected to said shaft, a brake assembly for said shaft and including a stationary hub, a plurality of pins carried by means fixed to said shaft, said pins being generally radially disposed with respect to the axis of rotation of said shaft and being symmetrically arranged about said axis, means normally biasing said pins radially inwardly of said shaft axis of rotation and into frictional rubbing engagement with said hub, said pins being movable generally radially outwardly under centrifugal force to release from rubbing engagement with said hub, whereby said pins are automatically disengaged from said hub upon energization of said motor and are automatically engaged in frictional rubbing relation with said hub upon de-energization of said motor.

2. An electric powered device comprising a housing having an electric motor therein, rotable output shaft means driven by said motor and supported upon said housing, tool means driven by said shaft, said shaft supporting means comprising a hub rigid with said housing and having bearing means therein engaged with said shaft, operable brake means rotatable with said shaft and including means movable generally radially thereof and generally aligned with said hub, said operable brake means being normally biased into frictional rubbing engagement with said hub and being operable, upon rotation of said shaft above a predetermined speed, to move out of rubbing engagement with said hub.

3. A power operated, rotary tool comprising a motor, output rotary shaft means driven by said motor and having tool means driven thereby, a fan fixed to said shaft and adapted to move cooling air through said motor, a plurality of radially movable members carried by said fan and normally biased in a generally radially inward direction, means defining a stationary surface circumscribing said shaft and within said fan and generally aligned with said radially movable members, said radially movable members being adapted to frictionally engage said surface when said shaft and fan are rotating below a predetermined speed, and being adapted to be released from rubbing engagement with said surface under the action of centrifugal force when said shaft and fan are rotating above said predetermined speed, whereby said movable members will be disengaged from said stationary surface during normal operation of said tool and will frictionally engage said stationary surface and bring said tool to an abrupt halt upon de-energization of said motor.

4. A power operated, rotary tool comprising a housing, a motor supported by said housing, a rotary member supported for rotation by said housing and driven by said motor, said rotary member having tool means driven thereby, centrifugal brake means associated with said rotary member, said brake means comprising rotor means rotatable with said rotary member and adapted to frictionally engage stator means, spring means normally biasing said rotor means into frictional rubbing engagement with said stator means, said rotor means being operable upon rotation of said rotary member above a predetermined speed and solely under the influence of centrifugal force, to move against said spring means and out of frictional engagement with said stator means, said rotor means being operable solely under the force of said spring means and at rotational speeds below said preselected level to reengage said stator means, whereby to apply a frictional braking force to said rotary member and said tool.

5. A power operated, rotary tool comprising a housing, a motor in said housing and having a rotatable armature shaft, a bearing carried by said housing and supporting said shaft adjacent one end, said shaft one end extending beyond said bearing and having tool means fixed thereto, said housing defining a stationary hub surrounding said bearing, a rotor body secured to said shaft between said hub and said tool means and having a portion confronting said hub, operable brake means carried by said rotor and normally biased into frictional rubbing engagement with said hub, said operable brake means being subject to centrifugal force during rotation of said shaft and said rotor whereby to move said operable brake means out of frictional engagement with said stationary hub.

6. A centrifugally operated brake assembly for a rotary shaft comprising a housing having a bearing support, a bearing within said support and rotatably supporting a shaft extending therethrough, said support defining an annular surface, a brake band fitted over said annular surface and releasably secured to said hub, a rotor fixed to said shaft adjacent said hub, a plurality of generally radially disposed brake members carried by said rotor and symmetrically located with respect to its axis of rotation, means normally biasing said brake members into frictional engagement with said brake band, said brake members being retractable out of engagement with said brake band when said rotor travels above a preselected speed and being reengageable with said brake band when said rotor speed drops below preselected level.

7. A powered device comprising a housing having an electric motor therein, said electric motor having a rotatable armature shaft, said housing including a hub surrounding said shaft and having a bearing therein rotatably supporting said shaft, said hub having an outer annular surface, an annular brake band generally complimentary to said hub surface and releasably secured thereto, a rotor fixed to said armature shaft and having a portion generally aligned with said brake band, a plurality of weighted members carried by said rotor at symmetrical locations therearound and movable under centrifugal force away from said brake band, spring means carried by said rotor and normally biasing said weighted members into frictional engagement with said brake band, said weighted members being movable radially outwardly out of frictional engagement with said brake band in response to rotation of said rotor at a speed in excess of a predetermined level.

8. A device as defined in claim 7 wherein said hub and said brake band are generally frustro-conical in configuration, said weighted members being movable along a line generally normal to planes tangent to said frustro-conical surfaces.

9. A device as defined in claim 7 wherein said rotor includes a fan having blades and adapted, when rotated, to draw cooling air through said motor.

10. A device as defined in claim 6 wherein said band includes resilient fingers integral therewith and releasably receivable in slots in said support, whereby to releasably retain said band against axial and rotational movement relative to said support.

11. A centrifugal brake assembly for a rotary powered device which includes rotating shaft means, said brake comprising a bearing support including an annular hub surrounding said shaft means, a rotatable member fixed to said shaft and rotatable therewith, said rotatable member having centrifugally operated means normally biased toward said annular surface and movable away therefrom under centrifugal force generated by rotation of said shaft means and said rotatable member, a brake band releasably fitted over said annular surface, said band including a radial inturned flange at one end extending radially inwardly of said hub, said band having resilient means integral therewith adjacent the other end thereof and cooperable with said hub to releasably retain said band in position thereon.

12. An edger-trimmer comprising a motor housing supported for movement over the ground, a motor in said housing and driving a rotatable output shaft, an edger-trimmer blade fixed to said shaft for rotation therewith, fan means fixed to said shaft and adapted to draw cooling air through said motor and discharge it outwardly of said housing, support means for said shaft including a bearing support adjacent said fan and rigid with said housing, a bearing within said support and rotatably supporting said shaft, an annular band releasably secured to said bearing support and having a portion extending radially inwardly thereof and overlaying at least a portion of said bearing, said fan including centrifugally operating, weighted means normally biased into frictional engagement with said band and movable away therefrom under centrifugal force developed during rotation of said fan, said band serving to isolate said bearing from the air moved by said fan during operation of said edger-trimmer.

13. A powered device comprising a housing having an electric motor therein, said electric motor having a rotatable armature shaft, said housing including a hub surrounding said shaft and having a bearing therein rotatably supporting said shaft, said hub having an outer annular surface, an annular brake band generally complimentary to said hub surface and releasably secured thereto, a rotor fixed to said armature shaft and having a portion generally aligned with said brake band, a plurality of weighted members carried by said rotor at symmetrical locations therearound and movable under centrifugal force away from said brake band, spring means carried by said rotor and normally biasing at least one of said weighted members into frictional engagement with said brake band, said at least one weighted member being movable radially outwardly out of frictional engagement with said brake band in response to rotation of said rotor at a speed in excess of a predetermined level.

* * * * *